W. F. TEMPLETON.
CHURN.
APPLICATION FILED AUG. 2, 1910.
987,773.
Patented Mar. 28, 1911.
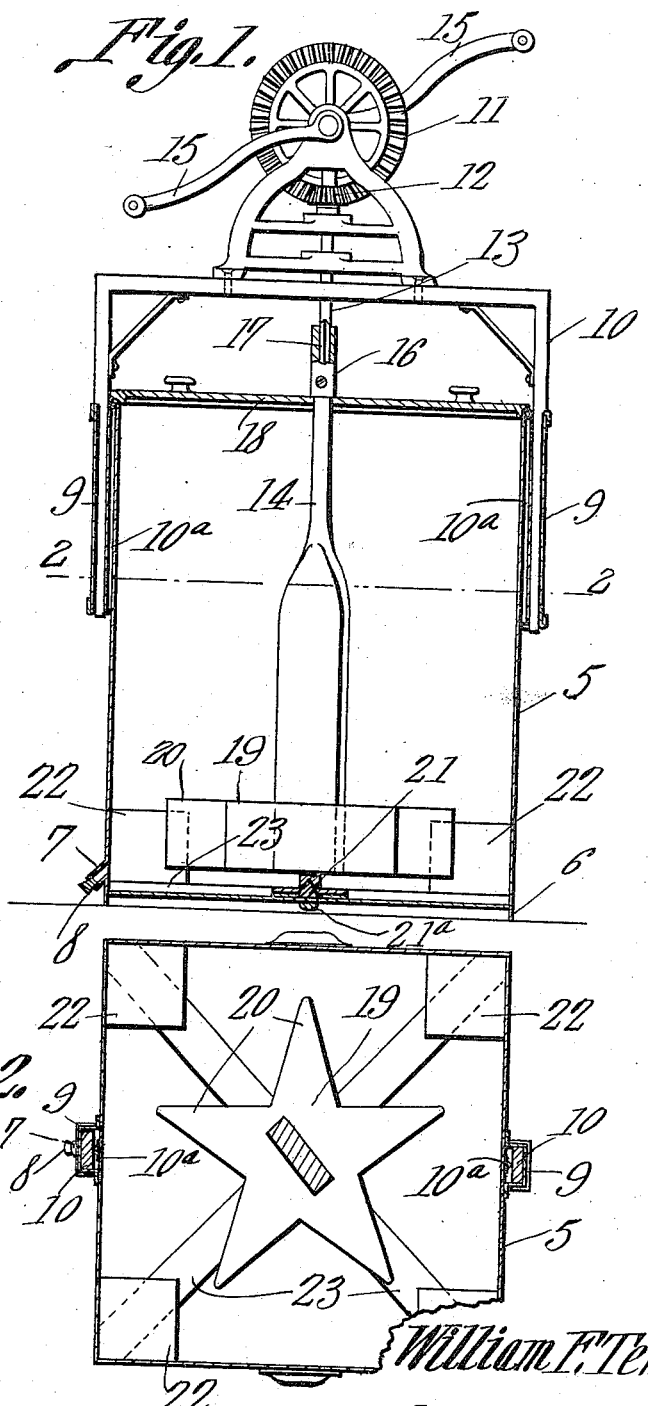
Witnesses
William F. Templeton,
Inventor
by
Attorneys

UNITED STATES PATENT OFFICE.

WILLIAM F. TEMPLETON, OF BIG CUT, VIRGINIA.

CHURN.

987,773.   Specification of Letters Patent.   Patented Mar. 28, 1911.

Application filed August 2, 1910. Serial No. 575,106.

*To all whom it may concern:*

Be it known that I, WILLIAM F. TEMPLETON, a citizen of the United States, residing at Big Cut, in the county of Scott and State of Virginia, have invented a new and useful Churn, of which the following is a specification.

This invention relates to improvements in the churn disclosed in my Patent No. 896,482, dated August 18, 1908, the object of the present invention being to provide improved means for mounting the cream breakers, and also to provide a novel form of dasher stem by which the butter is quickly gathered and balled.

Other objects and advantages of the present structure will be apparent from the detailed description appearing hereinafter, reference being had to the accompanying drawing forming a part of this specification, in which drawing—

Figure 1 is a vertical section of the churn. Fig. 2 is a horizontal section on the line 2—2 of Fig. 1.

In the drawing, 5 denotes the cream receptacle, the same being rectangular in form as shown, and having at the bottom a depending marginal flange 6, to hold said bottom above the ground. At the bottom of the receptacle is the short spout 7, through which the buttermilk may be discharged, said spout being provided with a suitable closure 8. However this spout may be omitted, if desired.

On the outside of opposite side walls of the receptacle, at the upper portion thereof, are sockets 9 in which is supported a frame 10 carrying the dasher operating mechanism. On the walls of the receptacle, inside the sockets 9, are longitudinal ribs 10ª which are provided to facilitate the entry and removal of the frame 10. The dasher operating mechanism comprises a bevel gear 11 which is in mesh with a bevel pinion 12 on a shaft 13 which is coupled to the dasher stem 14. The shaft of the gear 11 is provided with operating handles 15. The upper end of the dasher stem 14 carries a sleeve 16 having at its upper end a socket 17 into which extends the lower end of the shaft 13, said end of the shaft and the socket being angular in cross section so that the rotary movement of the shaft will be imparted to the dasher stem. The shaft seats loosely in the socket, and may therefore be removed therefrom. The top of the receptacle is provided with a suitable closure 18 which is removable to permit filling of the receptacle, as well as removal of the butter therefrom. The frame 10, together with the parts carried thereby, is removable from the receptacle, so that access to the latter may be readily had.

The dasher is of stellaform configuration and comprises a hub 19, and a plurality of radial arms 20 extending therefrom, said arms being horizontal. The hub is connected to the dasher stem 14. For some distance above the dasher, the stem is rectangular in cross section, said section being of greater width than thickness, which gives the stem the shape of a paddle. By thus shaping the dasher stem, the butter is quickly gathered and balled.

The bottom of the receptacle, in the center thereof, is provided with a step bearing 21. The dasher stem 14 extends through the hub 19, and projects a short distance from the bottom of the latter, the projecting end being formed with an axial bearing socket into which the bearing 21 extends. The bottom is protected by a button 21ª which is built up with solder to come nearly flush with the flange 6.

In the corners of the receptacle, at the bottom thereof, are cream breakers 22, consisting each of a cubical block so disposed that one of its vertical corners or edges projects toward the center of the churn, the arrangement being the same as in my former patent already referred to. These blocks are carried by a pair of bars 23 which are fastened together and constitute a cruciform member and extend into the corners of the receptacle, the blocks being rigidly secured to the outer ends of the bars and having their upper surfaces below the plane of the upper side of the dasher. The cross bars are supported on the bottom of the receptacle, and at their center are provided with an opening through which the step bearing 21 passes. This method of mounting the cream breakers in the receptacle, permits their ready removal for cleaning purposes. The cross bars are held firmly in place when the churn is in operation by being engaged by the lower end of the dasher stem around the bearing, as shown in Fig. 1.

Various minor changes in the structural details may be resorted to without a departure from the invention.

What is claimed is:

A churn comprising a rectangular upright body, a step bearing at the center of its bottom, and operating mechanism mounted upon its top, a cruciform member resting removably on the bottom of the body and having an opening through which the bearing projects, a dasher stem of greater width than thickness constituting a paddle journaled upon said bearing and adapted to be operatively connected to said operating mechanism, a stellaform dasher fixed to the lower portion of said stem, and cubical cream breaking blocks fixed to the extremities of the cruciform member and removably fitting within the corners of the body, each block having two flat unbroken vertical sides meeting in an inwardly projecting corner the upper surfaces of the blocks being below the plane of the upper surface of the dasher.

In testimony that I claim the foregoing as my own, I have hereto affixed my signature in the presence of two witnesses.

WILLIAM F. TEMPLETON.

Witnesses:
J. C. STEPHENSON,
J. M. ALLEY.

Copies of this patent may be obtained for five cents each, by addressing the "Commissioner of Patents, Washington, D. C."